United States Patent [19]

Crawford

[11] 4,431,679

[45] Feb. 14, 1984

[54] COMPOSITION FOR TREATING FISH FILLET TO INCREASE YIELD AND SHELF LIFE

[75] Inventor: David L. Crawford, Astoria, Oreg.

[73] Assignee: Benckiser-Knapsack GmbH, Ladenburg/Neckar, Fed. Rep. of Germany

[21] Appl. No.: 364,715

[22] Filed: Apr. 2, 1982

[51] Int. Cl.³ ............................ A23B 4/02; A23B 4/10
[52] U.S. Cl. .................................... 426/332; 426/335; 426/643; 426/654
[58] Field of Search ............... 426/266, 643, 332, 335, 426/652, 654

[56] References Cited

U.S. PATENT DOCUMENTS

| | | | |
|---|---|---|---|
| 3,134,678 | 5/1964 | Wierbicki et al. | 426/266 |
| 3,154,423 | 10/1964 | Voegeli et al. | |
| 3,591,389 | 7/1971 | Schneider | 426/643 X |
| 3,620,767 | 11/1971 | Swartz | 426/643 X |
| 3,692,534 | 9/1972 | Ueno et al. | |
| 3,875,313 | 4/1975 | Brotsky | |
| 4,011,346 | 3/1977 | Ernst | |
| 4,076,850 | 2/1978 | Nickerson et al. | |
| 4,136,204 | 1/1979 | Hughes et al. | 426/643 X |
| 4,221,819 | 9/1980 | Falci et al. | 426/643 X |
| 4,267,198 | 5/1981 | Sato et al. | |
| 4,293,578 | 10/1981 | Stone | |
| 4,299,852 | 11/1981 | Ueno et al. | |
| 4,305,966 | 12/1981 | Ueno et al. | |

Primary Examiner—Robert A. Yoncoskie
Attorney, Agent, or Firm—Richard S. Roberts; Kenneth P. Glynn

[57] ABSTRACT

The present invention is directed to a fillet fish product improvement composition, in its dry form and in its form as a solution, which includes a yield maintenance component containing a multi-compound phosphate mixture with a specified $P_2O_5$ content range, a preservative component selected from potassium sorbate, sorbic acid and mixtures thereof, and an acid component of citric acid and/or its equivalents, with a pH of about 5.6 to about 6.5.

18 Claims, No Drawings

COMPOSITION FOR TREATING FISH FILLET TO INCREASE YIELD AND SHELF LIFE

BACKGROUND OF INVENTION

Although there are many food preservative systems available today, there continues to be a need for compositions having effective multiple component functionality in the area of fish fillet treatment. It is known, for example, that many of the commercially avialable preservative compositions for meats, and even for shrimp, simply do not work as effectively with fish fillets. For this reason, and the fact that fish fillets are particularly difficult to preserve and to maintain yield, specific compositions which are unique to fillet fish product preservation are needed.

Thus, it is important to recognize that the preservation of edible protein, as well as the yield enhancement thereof, involves many very close arts in which the transfer of technology from, for example, meat treatment to fish treatment or even from shellfish to fish fillet treatment is seldom possible. Each type of protein product, poultry, fresh meat, eggs, cheeses, sausages, shell fish, frozen shrimp, fish fillet, etc., all have peculiar biochemical composition with different types of bacteriological problems, taste problems, deterioration, etc. For this reason, the art is replete with may differing compositions which appear at first blush to be similar and yet most often have unique application in only one field for one type of protein product. Such compositions are commercially, technically or otherwise unsuccessful or unacceptable when applied to other types of proteins. Thus, as the prior art below illustrates, there is very little that is obvious in this field. As will be more fully disclosed below, the present invention satisfies a long felt need, the solution to which has heretofore evaded the skilled artison.

PRIOR ART STATEMENT

U.S. Pat. No. 4,305,966 to Ueno et al is directed to preserving bacon by adding a composition comprising a nitrate with no more than 30 ppm of nitrate radical, up to 0.26% potassium sorbate (sorbic acid content), an aqueous solution of an acid, e.g. citric acid, with a pH of 6 or less, and sodium hexametaphosphate. However, this patent is not directed to preparations for fish; expressly excludes tripolyphosphates and pyrophosphates (Col. 2, line 47 et seq.); doesn't disclose the claimed ranges herein; and, unlike the present invention, requires nitrates.

U.S. Pat. No. 4,299,852 to Ueno et al describes a botulinal-resistant meat product preparation which contains sorbic acid or potassium sorbate, glycerol monoester of C-10 to C-12 fatty acids and sodium hexametaphosphate, with or without a nitrous acid compound. However, these teachings involve meat products and not fish; require a fatty acid glycerol monoester; do not establish the required phosphate mixture of the present invention or the ranges, and do not include citric acid or its equivalent.

U.S. Pat. No. 4,293,578 to Stone covers the treatment of fresh shrimp to reduce moisture and nutrient loss, the treatment comprising an effective amount (e.g. about 1 to 2%) of $Na_3P_5O_{10}$ (sodium tripolyphosphate) contained within flake ice or crushed ice. It is disclosed that shrimp treatment with a mixture of sodium tripolyphosphate and sodium hexametaphosphate is known to prevent liquid losses. It is also disclosed that the prior art teaches the use of a molecularly dehydrated sodium and potassium phosphate, e.g. sodium tripolyphosphate or an orthophosphate, to increase yield with fish. This patent fails to teach the combination of phosphates claimed herein; fails to teach the combination of the citric acid with the phosphates of the present invention; and, fails to teach the combination of all of these with the postassium sorbate and/or sorbic acid.

U.S. Pat. No. 4,076,850 teaches the preservation of hard boiled eggs, cooked, peeled shrimp and cooked and uncooked scallops, etc. using a solution of (A.) either (1) methyl parabenzoic acid, or (2) a mixture of sorbic acid with sodium propionate; and (B.) either (1) citric acid neutralized with NaOH or KOH, with a pH of 4.5 to 5.5, or (2) a mixture of sodium or potassium dihydrogen phosphate with sodium or potassium monohydrogen phosphate and phosphoric acid. This patent teaches away from a combination of phosphates and citric acid; fails to disclose the phosphate combination of the present invention; requires parabenzoic acid, or sodium propionate and sorbic acid together, and otherwise fails to teach the present invention.

U.S. Pat. No. 4,011,346 to Ernst teaches the preparation of a pet food patty with a preservative composition of a bacteriostatic agent and an edible antimycotic. The bacteriostatic agent may be acid salts such as, for example, calcium acetate and sodium hexametaphosphate, but the agent is preferably an organic acid such as citric acid, etc. The antimycotic is a mixture of sorbic acid and salts thereof. This patent involves animal meat-containing dog food and not fish fillet; it teaches hexametaphosphate as a lesser alternative to citric acid and not as a co-component, and it otherwise fails to teach the present invention.

Other United States patents which teach the use of one or more components of the present invention, but which are believed to be less pertinent than the foregoing prior art references are: U.S. Pat. Nos. 4,267,198; 3,875,313; 3,692,534 and 3,154,423.

SUMMARY OF INVENTION

The present invention is directed to a fillet fish product improvement composition, in its dry form and in its form as a solution, which includes a yield maintenance component containing a three phosphate-containing compound mixture with a specified $P_2O_5$ content range, a preservative component selected from potassium sorbate, sorbic acid and mixtures thereof, and an acid component of citric acid and/or its equivalents, with an adjusted pH of about 5.6 to about 6.5.

DETAILED DESCRIPTION OF INVENTION

The present invention fillet fish product improvement composition includes a yield maintenance component, a preservative component and an acid component. The combination of specific components of the present invention, it is believed, creates a synergistic result whereby the yield maintenance component is more effective than when used alone.

The yield maintenance component of the improvement composition of the present invention acts to prevent the loss of fluids from the fillet fish product. It aids in the retention of water and organic juices which would otherwise be lost through drip emanating from cut muscle tissues occuring during cold storage of the fillet. Without this component, the yield, i.e. the weight of fillet sold as a percentage of its original weight, would decrease rapidly with time. This component prevents the yield from decreasing so rapidly and thus "maintains" the yield. Since the final yield is also greater than it would otherwise be, the yield maintenance component is alternatly characterized as "improving" or "enhancing" the yield.

The yield maintenance component herein is a two or more compound-containing component. More specifically, this component contains at least two of the following: (i) about 5% to about 95% by weight of sodium pyrophosphate (-diphosphate), potassium pyrophosphate (-diphosphate) or a mixture thereof; (ii) about 14% to about 90% by wieght of sodium tripolyphosphate, potassium tripolyphosphate or a mixture thereof, and (iii) about 5% to about 50% of sodium hexametaphosphate, potassium hexametaphosphate or a mixture thereof. Preferred are the sodium salts, although potassium salts or a mixture thereof may be used. Percentages given are by weight based on the total weight of the yield maintenance component. Preferred ranges for these three subcomponent groups of the yield maintenance component are: (i) about 0% to about 80%; (ii) about 60% to about 90%; and, (iii) about 10% to about 40%. Most preferred is the component containing: about 60% to about 90% of (ii) and about 10% to about 40% of (iii).

The yield maintenance component has a statistical average content by weight of about 47% to about 68% of $P_2O_5$. This component is currently marketed in specific selected compositions within the scope of the foregoing under the trademarks Brifisol, Brifisol D-510 and Brifisol 512 and sold by BK-Ladenberg Corporation of North Hollywood, California.

The preservative or shelf life component of the present invention consists of potassium sorbate, sorbic acid or a mixture thereof in an amount by weight of about 0.1 to about 0.2 parts per part of said yield maintenance component, and preferably about 0.13 to about 0.16 parts per part of said yield maintenance component.

The acid component is selected from the group of edible organic acids consisting of citric acid, its functional equivalents and mixtures thereof. The acid component has an equivalent-weight of 30 to 200 and is used in an amount sufficient to adjust the pH into a range of about 5.6 to about 6.5, preferably about 5.8 to about 6.3.

The foregoing components may be combined in "dry" form and transported and stored as such. When being used to coat the fillet fish product, however, a solution form is advantageous. Thus, the dry mixture may be added to any edible liquid vehicle which is functionally inert to the yield maintenance component and the preservative component. By functionally inert is meant having no detrimental affect on the functioning of these components. Such edible liquid vehicles may include water, various fats and natural oils, etc. One preferred vehicle is water.

In general, at least about 80% of the total weight of the solution should be the liquid vehicle, preferably, at least about 85% may be used. The solution is generally applied to the surface of the fillet fish product by conventional means, e.g. spraying or dipping, and is used in an effective amount. In general, when dipping is employed, an effective amount may be absorbed by the fillet with a dipping time of at least about 30 to 40 seconds, and preferably about 50 to 120 seconds, e.g. 60 seconds. Exact dipping times may vary with the size of the fillet and with the particular species. When spraying is employed, about 2 to about 10 grams of solution per 100 grams of fillet fish product may be used, e.g. about 2 to about 7 grams of solution per 100 grams of fillet fish product. With very large fish, lower amounts may be effective.

The present invention is more fully set forth by way of the following discussion, data and examples. However, the present invention is characterized by the claims attached hereto and should not be construed to be specifically limited to the following examples.

EXAMPLES OF THE INVENTION

All of the following Examples were designed to document the effectiveness of the fillet fish product treatment composition of the present invention. The treatment composition possessed the following formulation:

|  | Concentration (% wt./wt.) | |
| --- | --- | --- |
|  | Dry mixture | Solution |
| Sodium Tripolyphosphate | 61.52% | 7.998% |
| Sodium Hexametaphosphate | 15.38 | 1.999 |
| Citric Acid | 11.6 | 1.508 |
| Potassium Sorbate | 11.5 | 1.495 |
| Sub-Total | 100. | 13.000 |
| Water | — | 87.000 |
| TOTAL | 100. | 100. |

This present invention treatment composition containing the sodium tripolyphosphate and the sodium hexametaphosphate had an average $P_2O_5$ content of about 59%.

Examples 1 to 64 involved yellowtail rockfish (*Sebastes flavidus*). Yellowtail rockfish is one of the more important commercial species of rockfish found from Todos Santos Bay, Baja California to southeastern Alaska. Maturation is achieved in 5 years or at a 13-inch (33 cm) length; maximum recorded length in 26-inches (66 cm). They form schools off the bottom and are taken commercially by trawl nets. Processing yields fillets of intermediate quality. Raw fillets are subject to a degree of discoloration during refrigerated storage; more than some better quality species, but less than others. Fillet quality varies more markedly for individual fish than better quality species.

EXAMPLES 1 TO 6—Microbial Stability

Yellowtail rockfish handled in a normal commercial manner were obtained from a local processor and held overnight at 34° F. (1.1° C.). Fish were hand filleted at approximately 3 days post-catch. Fillet batch sizes to meet experimental requirements were treated in the present invention composition shown immediately above (treatment) (determined pH=6.10) and in water (control) at 34° F. (1.1° C.) for 60 sec. Yield post-processing was determined after a 120 sec drain period. Frozen control samples were immediately vacuum sealed in moisture-vapor proof film and frozen at −30° F. (−34.4° C.) and stored at 0° F. (−17.8° C.).

Microbial stability of refrigerated fillets was determined using standard aerobic plate count procedures (growth medium composition % wt./vol.:2.35 standard plate count agar, 0.5 tryptone, 0.5 NaCl; incubation temperature: 25° C.). Duplicate plating of 3 fillet replicates stored in individual polyethylene bags were carried out at appropriate time periods during storage at 34° F. (1.1° C.).

Treatment of fillets with the present invention composition markedly retarded the initiation of exponential growth at 34° F. (1.1° C.) and approximately doubled maximum commercial shelf-life. The computed time to onset of exponential growth was extended from 1.4 for the control to 6.9 days for the present invention treated fillets. If a maximum commercial microbial shelf-life is established a $1 \times 10^6$ organisms/g, the maximum computed shelf-life was extended from 6.8 days for the control to 12.4 days for the present invention treated fillets. Bi-daily results over a two week period are shown in table 1.

cial practice fish are delivered to retail markets at approximately 3 days post-catch and are marketed up to 10 days post-catch depending upon initial fillet quality. The net gain for the chemical treatment in this marketing system would range from 3.49 to 7.9 lb/100 lb of fillets. This would yield a savings of $3.839 to $8.690/100 lb of fillets wholesale at the January, 1982 value for this species ($1.10/lb in large lots). Based upon only yield and drip loss, the economic advantage of the treatment can be expressed as a value of the dry chemical treatment mixture to the processor. Neglecting treatment solution start-up volumes, 4.6 lb of treatment

TABLE 1

Microbial Stability of Processed Fillets Stored Under Refrigeration (34° F., 1.1° C.).

| Storage time (days) | Control Examples[1,2,3] | Organisms/gm Count | Mean | Present Invention Examples[2,3,5] | Organisms/gm Count | Mean |
|---|---|---|---|---|---|---|
| 0 | 1 | 260 | 202 | 4 | 245 | 307 |
|   | 2 | 155 |   | 5 | 335 |   |
|   | 3 | 190 |   | 6 | 340 |   |
| 4 | 1 | 11,050 | 9,817 | 4 | 320 | 305 |
|   | 2 | 4,350 |   | 5 | 325 |   |
|   | 3 | 14,050 |   | 6 | 270 |   |
| 8 | 1 | $13.8 \times 10^6$ | $16.1 \times 10^6$ | 4 | 1755 | 1292 |
|   | 2 | $12.75 \times 10^6$ |   | 5 | 1590 |   |
|   | 3 | $21.75 \times 10^6$ |   | 6 | 530 |   |
| 10 | 1 | $130 \times 10^6$ | $82.8 \times 10^6$ | 4 | $174 \times 10^3$ | $75.9 \times 10^3$ |
|   | 2 | $66 \times 10^6$ |   | 5 | $41 \times 10^3$ |   |
|   | 3 | $52.5 \times 10^6$ |   | 6 | $12.8 \times 10^3$ |   |
| 12 | 1 | — |   | 4 | $1.37 \times 10^6$ | $1.01 \times 10^6$ |
|   | 2 | — |   | 5 | $1.54 \times 10^6$ |   |
|   | 3 | — |   | 6 | $102 \times 10^3$ |   |
| 14 | 1 | — |   | 4 | $36 \times 10^6$ | $16 \times 10^6$ |
|   | 2 | — |   | 5 | $8.9 \times 10^6$ |   |
|   | 3 | — |   | 6 | $3.1 \times 10^6$ |   |

[1]Water
[2]Mixed chemical treatment of present invention
[3]Mean of duplicate
[4]Exponential growth function (replications for 4 through 8 days; n = 9): $y = 22.915614e^{1.563833x}$, r = .981010 (Sig. P $\geq$ .001); computed time to initiation of exponential growth (202 organisms/g): 1.392 days; computed time to approximately $1 \times 10^6$ microorganisms/g: 6.832.
[5]Exponential growth function (replications for 8 through 14 days; n = 12): $y = .009966e^{1.491062x}$, = .955035 (Sig. P $\geq$ .001); computed time to initiation of exponential growth (306) organism/g): 6.930 days; computed time to approximately $1 \times 10^6$ organisms/g: 12.356 days.

EXAMPLES 7 TO 10—Yield/Drip Loss

Drip loss during refrigerated (34° F.; 1.1° C.) storage was determined for 4 replicate units in polyethylene bags composed of 3 fillets each. Fillet weight after a 120 sec drain was determined at appropriate times post-processing. Drip loss was expressed as fillet yield and reported as a percent of fillet weight pre-process.

Treatment with the present invention composition produced a 5.3 fold reduction in the rate of drip loss from fillets during storage at 34° F. (1.1° C.). An initial 60 sec exposure of initial fillets to water (Example 7-Control) and the treatment solution of the present invention (Example 8) produced nearly the same initial yield increase (approximately 104% of pre-process weight) (Table 2). Control fillets, however, lost added water and muscle drip at a more rapid rate than present invention treated fillets. Treated fillets did not lose all of the weight added by the treatment over a 14 day storage period.

Results indicated that 100 lb of fillets exposed to water would deliver 100 lb of product at 3.9 days post-process under refrigerated storage. Only 96.0 lbs of fillets exposed to the chemical treatment would be required to deliver 100 lb at 3.9 days. The computed total yield advantage of fillets exposed to the chemical treatment over those exposed to water equaled 0.63 lb/100 lb/day of storage+1.6 lb/100 lb (Table 3). In commersolution was required to yield 100 lb of treated fillets. At 13% concentration, 100 lb of fillets required 0.598 lb of dry chemical mixture. The dry chemical mixture would be worth from $6.420 to $14.532/lb to the processor.

TABLE 2

Fillet Yield Through Treatment And Drip Loss During Refrigerated Storgae

| | Percent of Pre-Process Weight[1] | | | |
|---|---|---|---|---|
| Storage Time (days) | Example 7-Control[2] | | Example 8-Treatment[3] | |
| | Mean[4] | S.D. | Mean | S.D. |
| 0 | 104.1 | 1.0 | 104.7 | 0.6 |
| 2 | 100.1 | 1.2 | 104.3 | 0.3 |
| 5 | 98.7 | 1.1 | 104.1 | 0.5 |
| 7 | 97.7 | 0.9 | 103.8 | 0.7 |
| 9 | 96.4 | 1.3 | 103.3 | 0.8 |
| 12 | —[5] | | 102.8 | 0.6 |
| 14 | —[5] | | 102.6 | 0.8 |

[1]Weight of fillet after 60 sec treatment at 34° F. (1.1° C.) and subsequent 120 sec drain/weight of fillet pre-process × 100.
[2]Water.
[3]Mixed chemical treatment.
[4]Four × 2 fillet units.
[5]Spoiled.

TABLE 3

Computed[1] Quantity Of Fillets Prior To Processing Required To Meet A Delivered Unit Weight At Various Times Under Refrigeration Post-Process.

| Storage Time (days) | Pounds/100 lb delivered | | Net Gain (lb/100 lb) |
|---|---|---|---|
| | Example 9-Control[2] | Example 10-Treatment[3] | |
| 0 | 97.0 | 95.4 | 1.6 |
| 2 | 98.5 | 95.7 | 2.8 |
| 5 | 100.9 | 96.2 | 4.7 |
| 7 | 102.5 | 96.5 | 6.0 |
| 9 | 104.0 | 96.8 | 7.2 |
| 12 | —[4] | 97.2 | —[4] |
| 14 | —[4] | 97.5 | —[4] |

[1] Based upon the linear regression of the lb of fillets prior to processing required to yield a 100 lb delivered weight on storage time under refrigeration at 34° F. (1.1° C.); Control: y = .784774x + 96.965037 (n = 20; r = .907096, P > .001); Treatment: y = .146634x + 95.455700 (n = 28; r = .791052, P ≧ .001).
[2] Water.
[3] Mixed chemical treatment.
[4] Spoiled.

EXAMPLES 11 TO 16—Fillet Composition

Alterations of fillet chemical characteristics by treatment was assessed by analysis of 3 fillet replicates. Potassium sorbate and total phosphorus content was determined using spectrophotometric procedures. Moisture was reported as weight loss after 12–16 hours of oven drying at 100° C. Total ash was expressed as wet weight remaining after 12 hrs of heating at 650° C. Sodium and potassium were determined from a wet ash of the fillet utilizing atomic absorption procedures.

Exposure of yellowtail rockfish fillets to a 60 sec with the present invention composition treatment produced lower moisture and higher ash contents than fillets exposed to water for an equal time period (Table 4). The initial average moisture content of fillets treated in water was 102.6% of treated fillets. This rather large difference was partially related to the lower average weight of control fillets (272.4 g) over present invention treated fillets (302.6 g). Small fillets possessed a much greater surface area per unit weight allowing greater absorption of dip solution. Initial moisture contents possessed a linear (P≧0.025) relationship to fillet weight regardless of treatment.

Treatment with the present invention composition increased fillet ash solids; average treatment fillet ash content was 156.5% of the control wet weight. This difference was somewhat exaggerated by the higher moisture content of control fillets. Dry weight, average treated fillet ash content was 126.1% of the control.

The phosphorus content of fillets was increased from an average of 444 to 786 mg $P_2O_5$/100 g wet weight by the present invention treatment (Table 4). This was equivalent to an addition of 74 mg phosphorus/100 g wet weight yielding a total average phosphorus content of 171 mg/100 g wet weight. This added phosphorus would be equivalent to 590 mg of total phosphorous-containing compounds/100 gm (0.59% wet wt.). Average treated fillet phosphorus level was less than that reported for raw muscle from chicken (203 mg P/100 g), beef (188 mg P/100 g) and only slightly higher than pork muscle (152 mg P/100 g).

The average sodium and potassium content of fillets was increased by the present invention treatment by 179 mg and 29 mg/100 g wet weight, respectively (Table 4). Average sodium content was increased from 35 to 214 mg/100 g. The sodium content of treated fillets far exceeded that reported for muscle from chicken (58 mg/100 g), pork (47 mg/100 g) and beef (65 mg/100 g). Addition of 179 mg of sodium/100 g derived from condensed phosphate would be equivalent to a fillet salt (NaCl) content of 455 mg/100 g (0.455% wet wt.). Potassium added from absorbed potassium sorbate only slightly altered the relationship of fish fillets to other meat product. The potassium content of control (398 mg/100 g) and treated (427 mg/100 g) fillets both exceeded that of muscle from chicken (285 mg/100 gm), pork (216 mg/100 g) and beef (299 mg/100 mg) by approximately 100 mg/100 g. Although nutritionists disagree as to which is most important, sodium content or the ratio of dietary sodium/potassium, chemical treatment markedly altered this ratio in fish fillets. The sodium/potassium ration for fillets was altered from 0.09 to 0.50 by the present invention treatment and varied considerably from that of muscle from chicken (0.02), pork (0.22) and beef (0.22).

Treatment of fillets with the present invention yielded an average of 92.4 mg potassium sorbate/100 g of fillet under the solution time and temperature conditions used. Potassium sorbate levels varied somewhat in relation to fillet weight; small fillets with a greater surface area/unit weight contained higher concentrations. The spectrophotometric procedure used detected compounds in control fillets which are reported in Table 4 as potassium sorbate. Fillets from some species of rockfish including yellowtail rockfish contain these compounds, others do not. If the average content of the control of 2.6 mg/100 g is subtracted from the treatment content, potassium sorbate added by the 60 sec treatment at 34° F. (1.1° C.) added approximately 90 mg potassium sorbate/100 g.

TABLE 4

Composition of Processed Fillets.

| Example | Rep./fillet wt. (g) | Moisture (%) | Ash (%) | K-sorbate (mg/100g) | P (mg $P_2O_5$/100g) | Na (mg/100g) | K (mg/100g) |
|---|---|---|---|---|---|---|---|
| 11-Control | 301.3 | 77.16 | 1.18 | 2.77 | 468 | 36.8 | 399.1 |
| | | ±.50 | ±.00 | ±0.54 | ±3.5 | ±.5 | ±12.3 |
| 12-Control | 140.5 | 79.77 | 1.12 | 2.51 | 432 | 35.6 | 396.8 |
| | | ±.59 | ±.03 | ±.09 | ±7.1 | ±.6 | ±4.6 |
| 13-Control | 103.1 | 80.02 | 1.16 | 2.50 | 430 | 32.4 | 397.6 |
| | | ±.71 | ±.00 | ±.14 | ±24.7 | ±.5 | ±16.1 |
| Mean[1] | | 78.97 | 1.15 | 2.62 | 444 | 34.9 | 397.8 |
| S.D. | | ±1.48 | ±.03 | ±.29 | ±22.5 | ±2.0 | ±10.4 |
| 14-Treated | 135.0 | 76.89 | 1.95 | 102.71 | 853 | 278.5 | 416.6 |
| | | ±1.79 | ±.00 | ±.34 | ±13.4 | ±8.4 | ±2.2 |
| 15-Treated | 364.4 | 72.32 | 1.65 | 91.63 | 745 | 157.7 | 438.3 |
| | | 0.77 | ±.02 | 0.91 | ±0.7 | ±4.8 | ±2.7 |
| 16-Treated | 408.5 | 72.48 | 1.80 | 82.92 | 760 | 227.5 | 426.4 |
| | | ±0.82 | ±.00 | ±.20 | ±27.6 | ±11.3 | ±6.9 |
| Mean[1] | | 73.90 | 1.80 | 92.42 | 786 | 214.1 | 427.1 |

TABLE 4-continued

| | | | Composition of Processed Fillets. | | | |
|---|---|---|---|---|---|---|
| Example | Rep./fillet wt. (g) | Moisture (%) | Ash (%) | K-sorbate (mg/100g) | P (mg P$_2$O$_5$/100g) | Na (mg/100g) | K (mg/100g) |
| | S.D. | ±2.50 | ±.13 | ±8.47 | ±54.1 | ±51.8 | ±13.5 |

[1] Mean of analyses on all replications

EXAMPLES 17 TO 40—Fillet Appearance

The quality characteristics of fillets was evaluated utilizing a panel of twenty judges who normally judge a wide variety of food products. Quality factors were judged on a 9 point desirability scale, rangeing from 9, extremely desirable, to 1, extremely undesirable.

Judges evaluated raw fillets for appearance in fiberboard trays with a Saran overwrap. Four replicate samples for each treatment were judged for color, freshness and over-all desirability under fluorescent light. Raw fillets were judged at appropriate time periods commensurate with the projected microbial stability of control samples.

The overall appearances of control fillets were judged to be superior to fillets receiving the present invention treatment (Tables 5–7). Mean scores for color ($P \geq 0.001$), freshness ($P \geq 0.005$) were significantly higher than treated fillets. However, ranking of individual treatment mean scores revealed no significant ($P = 0.05$) difference between mean scores for all three appearance factors at each evaluation time. Only the power of the factorial design revealed a significant difference. This was largely due to the typical wide variation in the appearance of individual fillets from this species regardless of treatment.

Refrigerated storage altered raw fillet appearance more than treatment. Overall scores for color ($P \geq 0.001$) freshness ($P \geq 0.001$) and overall appearance ($P \geq 0.001$) varied significantly with respect to storage time. Ranking of individual means for each treatment with respect to storage time showed that scores for both treatments did not vary ($P = 0.05$) at 2, 5 and 7 days post-process. Scores for all three appearance factors describing both treatments were significantly ($p = 0.05$) reduced between 7 and 9 days post-process. Ranking did not reveal a difference in the rate of appearance degradation between control and treatment samples.

TABLE 5

Mean Appearance Panel Scores[1] For the Color of Raw Fillets.

| Process | Mean Ranking | Replicated Example[2] | Storage time post-process (days) | | | |
|---|---|---|---|---|---|---|
| | | | 2 | 5 | 7 | 9 |
| Control | | 17 | 7.15 | 5.85 | 6.05 | 4.85 |
| | | 18 | 5.45 | 5.70 | 5.50 | 4.75 |
| | | 19 | 7.65 | 7.20 | 7.40 | 6.05 |
| | | 20 | 5.50 | 5.35 | 5.20 | 3.80 |
| | Vertical[4] Horizontal[5] | Mean[3] | 6.44$^a$ 6.44$^x$ | 6.03$^a$ 6.03$^x$ | 6.04$^a$ 6.04$^x$ | 4.86$^a$ 4.86$^y$ |
| Treated | | 21 | 6.85 | 5.95 | 5.70 | 4.80 |
| | | 22 | 4.70 | 4.85 | 4.80 | 3.50 |
| | | 23 | 7.25 | 6.50 | 6.80 | 5.65 |
| | | 24 | 4.90 | 5.10 | 5.10 | 3.70 |
| | Vertical Horizontal | Mean | 5.93$^a$ 5.93$^x$ | 5.60$^a$ 5.60$^x$ | 5.60$^a$ 5.60$^x$ | 4.41$^a$ 4.41$^y$ |

| Factorial Analysis of Variance | | | |
|---|---|---|---|
| F-Value | | Level mean ranking[6] | |
| Treatment (A): | 10.216[8] | Process | Storage |
| Storage (B): | 22.194[8] | Control > Treatment | 2 > 7 > 5 > 9 |
| A × B: | 0.018[7] | | |

[1] Ranged from 9, extremely desirable, to 1, extremely undesirable.
[2] n = 20.
[3] n = 80.
[4] Mean values in a column (vertical) with same exponent letter ($^{a, b}$) did not vary significantly (P = .05).
[5] Mean values in a row (horizontal) with same exponent letter ($^{x, y}$) did not vary significantly (P = .05).
[6] Level means with same underline did not vary significantly (P = .05) from each other.
[7] N.S. P ≦ .05.
[8] Sig. P ≧ .001.

TABLE 6

Mean Appearance Panel Scores[1] For the freshness of Raw Fillets.

| Process | Mean ranking | Replicated Example | Storage time post-process (days) | | | |
|---|---|---|---|---|---|---|
| | | | 2 | 5 | 7 | 9 |
| Control | | 25 | 7.10 | 5.90 | 6.30 | 5.25 |
| | | 26 | 6.00 | 5.65 | 7.00 | 4.40 |
| | | 27 | 7.25 | 7.05 | 6.60 | 5.80 |
| | | 28 | 5.50 | 5.45 | 5.20 | 3.25 |
| | Vertical[4] Horizontal[5] | Mean[3] | 6.46$^a$ 6.46$^x$ | 6.01$^a$ 6.01$^x$ | 6.28$^a$ 6.28$^x$ | 4.68$^a$ 4.68$^y$ |
| | | 29 | 6.35 | 5.95 | 6.10 | 5.05 |
| | | 30 | 4.75 | 5.00 | 5.10 | 4.35 |
| | | 31 | 6.95 | 6.40 | 6.45 | 5.75 |
| | | 32 | 4.85 | 5.15 | 4.90 | 3.30 |
| | Vertical Horizontal | Mean | 5.73$^a$ 5.73$^x$ | 5.63$^a$ 5.63$^x$ | 5.64$^a$ 5.64$^x$ | 4.61$^a$ 4.61$^y$ |

| Factorial Analysis of Variance | | | |
|---|---|---|---|
| F-Value | | Level mean ranking[6] | |
| Treatment (A): | 11.295[8] | Process | Storage |
| Storage (B): | 24.053[8] | Control > Treatment | 2 > 7 > 5 > 9 |
| A × B: | 1.229[7] | | |

[1] Ranged from 9, extremely desirable, to 1, extremely undesirable.
[2] n = 20.
[3] n = 80.
[4] Mean values in a column (vertical) with same exponent letter ($^{a, b}$) did not vary significantly (P = .05).
[5] Mean values in a row (horizontal) with same exponent letter ($^{x, y}$) did not vary significantly (P = .05).
[6] Level means with same underline did not vary significantly (P = .05) from each other.
[7] N.S. P ≦ .05.
[8] Sig. P ≧ .001.

TABLE 7

Mean Appearance Panel Scores[1] For the Over-all Appearance of Raw Fillets.

| Process | Mean ranking | Replicated[2] Examples | Storage time post-process (days) | | | |
|---|---|---|---|---|---|---|
| | | | 2 | 5 | 7 | 9 |
| Control | | 33 | 7.00 | 5.80 | 6.20 | 5.05 |
| | | 34 | 5.75 | 5.70 | 5.65 | 4.35 |
| | | 35 | 4.70 | 7.05 | 7.05 | 5.75 |
| | | 36 | 5.33 | 5.35 | 5.20 | 3.30 |
| | Vertical[4] Horizontal[5] | Mean[3] | 6.36$^a$ 6.36$^x$ | 5.95$^a$ 5.98$^x$ | 6.03$^a$ 6.03$^x$ | 4.61$^a$ 4.61$^y$ |
| Treatment | | 37 | 6.45 | 6.05 | 5.65 | 4.85 |
| | | 38 | 4.65 | 5.00 | 5.00 | 3.65 |
| | | 39 | 7.05 | 6.45 | 6.45 | 5.60 |
| | | 40 | 4.08 | 5.15 | 4.95 | 3.30 |
| | Vertical Horizontal | Mean | 5.74$^b$ 5.74$^x$ | 5.66$^a$ 5.66$^x$ | 5.51$^a$ 5.51$^x$ | 4.35$^a$ 4.35$^y$ |

TABLE 7-continued

Factorial Analysis of Variance

| F-Value | | Level mean ranking[6] | |
|---|---|---|---|
| | | Process | Storage |
| Treatment (A): | 10.112[8] | | |
| Storage (B): | 27.780[9] | Control > Treatment | 2 > 5 > 7 > 9 |
| A × B: | 0.398[7] | | |

[1] Ranged from 9, extremely desirable, to 1, extremely undesirable.
[2] n = 20.
[3] n = 80.
[4] Mean values in a column (vertical) with same exponent letter (a,b) did not vary significantly (P = .05).
[5] Mean values in a row (horizontal) with same exponent letter (x,y) did not vary significantly (P = .05).
[6] Level means with same underline did not vary significantly (P = .05) from each other.
[7] N.S. $P \leq .05$.
[8] Sig. $P \geq .005$.
[9] Sig. $P \geq .001$.

EXAMPLES 41 TO 64—Cooked Fish Fillet Quality

The eating quality of cooked (baked to flaking in aluminum foil without salt) fish was judged for aroma, color, texture, juiciness, flavor and over-all desirability. Hot samples were served in coded cups to judges in individual booths under white light. The quality of the treatment was evaluated with both a fresh control and a frozen control. A frozen control evaluation was carried out to estimate the quality of treated fillets during their extended refrigerated shelf-life.

Cooked fresh treated/control fillet

Factorial analysis of the variance of scores for the aroma, color, texture, juiciness, flavor and overall desirability of cooked meat showed that judges preferred the desirability of treated over fresh control fillets (Table 8-13). This preference was only significant for flavor ($P \geq 0.001$) (Table 12) and overall desirability ($P \geq 0.005$) (Table 13). Ranking of individual treatment means was revealed that judges significantly (P = 0.05) preferred the flavor (Table 12) of treated fillets only at 2 and 9 days of refrigerated storage and overall desirability at 9 days (Table 13). Ranking also revealed a significant (P = 0.05) preference for the aroma (Table 8) and texture (Table 10) of treated fillets after 9 days of storage. The desirability of the color (Table 9) of control fillets was judged to be significantly superior only at the 7 day evaluation time. Ranking revealed no significant (P = 0.05) variation in scores for juiciness (Table 11).

Fresh fillet quality with regard to aroma ($P \geq 0.001$) (Table 8), color ($P \geq 0.025$) (Table 9), texture ($P \geq 0.005$) (Table 10), juiciness ($P \geq 0.025$), (Table 11), flavor ($P \geq 0.001$) (Table 12) and overall desirability ($P \geq 0.001$) (Table 13) degraded in a significant manner with respect to storage time. Inspection of the ranking of individual treatment means revealed very little difference in the overall rate of degradation between control and treatment samples with regard to color, texture, juiciness, flavor and overall desirability. The desirability of the aroma of control fillets was reduced more rapidly than treated fillets reflecting the more rapid microbial growth on control fillets during storage. Reduction of scores for treated fillets between 2 and 5 days post-process appeared to be more marked than for control fillets.

Application of the present invention treatment to fillets improved overall fillet quality and refrigerated shelf-life. The level of significance for improvement was somewhat achieved by the marked variability of individual fillets which was reflected in individual panelist judgments. This is typical of the quality characteristics of yellowtail rockfish fillets.

TABLE 8

Mean Sensory Panel Scores[1] For the Aroma of Cooked Fresh Fillets.

| Example/ Process | Mean Ranking | Storage time post-process (days) | | | |
|---|---|---|---|---|---|
| | | 2 | 5 | 7 | 9 |
| 41/ Control | Vertical[3] Horizontal[4] | $6.85^a$ $6.85^x$ | $6.25^a$ $6.25^{x,y}$ | $5.70^a$ $5.70^y$ | $4.65^a$ $4.65^z$ |
| 42/ Treatment | Vertical Horizontal | $6.80^a$ $6.80^x$ | $5.65^a$ $5.65^y$ | $5.90^a$ $5.90^{x,y}$ | $5.90^b$ $5.85^{x,y}$ |

Factorial Analysis of Variance

| F-Value | | Level mean ranking[5] | |
|---|---|---|---|
| | | Process | Storage |
| Treatment (A): | 0.549[6] | | |
| Storage (B): | 6.655[7] | Control < Treatment | 2 > 5 > 7 > 9 |
| A × B: | 2.216[6] | | |

[1] n = 20.
[2] Ranged from 9, extremely desirable, to 1, extremely undesirable.
[3] Mean values in a column (vertical) with same exponent letter (a,b) did not vary significantly (P = .05).
[4] Mean values in a row (horizontal) with same exponent letter (x,y,z) did not vary significantly (P = .05).
[5] Level means with same underline did not vary significantly (P = .05) from each other.
[6] N.S. $P \leq .05$.
[7] Sig. $P \geq .001$.

TABLE 9

Mean[1] Sensory Panel Scores[2] For the Color of Cooked Fresh Fillets.

| Example/ Process | Mean ranking | Storage time post-process (days) | | | |
|---|---|---|---|---|---|
| | | 2 | 5 | 7 | 9 |
| 43/ Control | Vertical[3] Horizontal[4] | $6.15^a$ $6.15^x$ | $6.25^a$ $6.25^y$ | $6.50^a$ $6.50^y$ | $5.10^a$ $5.10^y$ |
| 44/ Treatment | Vertical Horizontal | $7.05^a$ $7.05^x$ | $5.95^a$ $5.95^y$ | $5.55^b$ $5.55^y$ | $5.90^a$ $5.90^y$ |

Factorial Analysis of Variance

| F-Value | | Level mean ranking[5] | |
|---|---|---|---|
| | | Process | Storage |
| Treatment (A): | 0.241[6] | | |
| Storage (B): | 3.853[7] | Control < Treatment | 2 > 5 > 7 > 9 |
| A × B: | 3.790[7] | | |

[1] n = 20.
[2] Ranged from 9, extremely desirable, to 1, extremely undesirable.
[3] Mean values in a column (vertical) with same exponent letter (a,b) did not vary significantly (P = .05).
[4] Mean values in a row (horizontal) with same exponent letter (x,y) did not vary significantly (P = .05).
Level means with same underline did not vary significantly (P = .05) from each other.
N.S. $P \leq .05$.
[7] Sig. $P \geq .025$.

TABLE 10

Mean[1] Sensory Panel Scores[2] For the Texture of Cooked Fresh Fillets.

| Example/ Process | Mean ranking | Storage time post-process (days) | | | |
|---|---|---|---|---|---|
| | | 2 | 5 | 7 | 9 |
| 45/ Control | Vertical[3] Horizontal[4] | $6.25^a$ $6.25^{x,y}$ | $5.40^a$ $5.40^{y,z}$ | $6.50^a$ $6.50^x$ | $5.20^a$ $5.20^z$ |
| 46/ | Vertical | $6.90^a$ | $5.65^a$ | $6.35^a$ | $6.25^b$ |

TABLE 10-continued

| Treatment | Horizontal | 6.90$^x$ | 5.65$^y$ | 6.35$^{x,y}$ | 6.25$^{x,y}$ |

Factorial Analysis of Variance

| F-Value | Level mean ranking[5] | |
|---|---|---|
| Treatment (A): 3.504[6] | Process | Storage |
| Storage (B): 4.596[7] | Control < Treatment | 2 > 5 > 7 > 9 |
| A × B: 1.153[6] | | |

[1] n = 20.
[2] Ranged from 9, extremely desirable, to 1, extremely undesirable.
[3] Mean values in a column (vertical) with same exponent letter (a,b) did not vary significantly (P = .05).
[4] Mean values in a row (horizontal) with same exponent letter (x,y,z) did not vary significantly (P = .05).
[5] Level means with same underline did not vary significantly (P = .05) from each other.
[6] N.S. P≦.05.
[7] Sig. P≧.005.

TABLE 11

Mean[1] Sensory Panel Scores[2] For the Juiciness of Cooked Fresh Fillets.

| Example/ Process | Mean ranking | Storage time post-process (days) | | | |
|---|---|---|---|---|---|
| | | 2 | 5 | 7 | 9 |
| 47/ Control | Vertical[3] | 6.55$^a$ | 5.75$^a$ | 6.60$^a$ | 5.10$^a$ |
| | Horizontal[4] | 6.55$^x$ | 5.75$^{x,y}$ | 6.60$^x$ | 5.40$^y$ |
| 48/ Treatment | Vertical | 7.15$^a$ | 5.80$^a$ | 6.35$^a$ | 5.90$^a$ |
| | Horizontal | 7.15$^x$ | 5.80$^y$ | 6.35$^{x,y}$ | 5.90$^y$ |

Factorial Analysis of Variance

| F-Value | Level mean ranking[5] | |
|---|---|---|
| Treatment (A): 1.661[6] | Process | Storage |
| Storage (B): 7.129[7] | Control < Treatment | 2 > 5 > 7 > 9 |
| A × B: 1.084[6] | | |

[1] n = 20.
[2] Ranged from 9, extremely desirable, to 1, extremely undesirable.
[3] Mean values in a column (vertical) with same exponent letter (a) did not vary significantly (P = .05).
[4] Mean values in a row (horizontal) with same exponent letter (x,y) did not vary significantly (P = .05).
[5] Level means with same underline did not vary significantly (P = .05) from each other.
[6] N.S. P≦.05.
[7] Sig. P≧.025.

TABLE 12

Mean[1] Sensory Panel Scores[2] For the Flavor of Cooked Fresh Fillets.

| Example/ Process | Mean ranking | Storage time post-process (days) | | | |
|---|---|---|---|---|---|
| | | 2 | 5 | 7 | 9 |
| 49/ Control | Vertical[3] | 5.70$^a$ | 4.90$^a$ | 5.00$^a$ | 3.50$^a$ |
| | Horizontal[4] | 5.70$^x$ | 4.90$^x$ | 5.00$^x$ | 3.50$^y$ |
| 50/ Treatment | Vertical | 6.90$^b$ | 5.55$^a$ | 5.65$^a$ | 5.00$^b$ |
| | Horizontal | 6.90$^x$ | 5.55$^y$ | 5.65$^y$ | 5.00$^y$ |

Factorial Analysis of Variance

| F-Value | Level mean ranking[5] | |
|---|---|---|
| Treatment (A): 13.052[7] | Process | Storage |
| Storage (B): 9.171[7] | Control < Treatment | 2 > 5 > 7 > 9 |
| A × B: 0.543[6] | | |

[1] n = 20.
[2] Ranged from 9, extremely desirable, to 1, extremely undesirable.
[3] Mean values in a column (vertical) with same exponent letter (a,b) did not vary significantly (P = .05).
[4] Mean values in a row (horizontal) with same exponent letter (x,y) did not vary significantly (P = .05).
[5] Level means with same underline did not vary significantly (P = .05) from each other.
[6] N.S. P≦.05.
[7] Sig. P≧.001.

TABLE 13

Mean[1] Sensory Panel Scores[2] For the Over-all Desirability of Cooked Fresh Fillets.

| Example/ Process | Mean ranking | Storage time post-process (days) | | | |
|---|---|---|---|---|---|
| | | 2 | 5 | 7 | 9 |
| 51/ Control | Vertical[3] | 5.75$^a$ | 5.05$^a$ | 5.45$^a$ | 3.70$^a$ |
| | Horizontal[4] | 5.75$^x$ | 5.05$^x$ | 5.45$^x$ | 3.70$^y$ |
| 52/ Treatment | Vertical | 6.80$^a$ | 5.55$^a$ | 5.60$^a$ | 5.05$^b$ |
| | Horizontal | 6.80$^x$ | 5.55$^y$ | 5.60$^y$ | 5.05$^y$ |

Factorial Analysis of Variance

| F-Value | Level mean ranking[5] | |
|---|---|---|
| Treatment (A): 8.342[7] | Process | Storage |
| Storage (B): 8.790[8] | Control < Treatment | 2 > 5 > 7 > 9 |
| A × B: 1.042[6] | | |

[1] n = 20.
[2] Ranged from 9, extremely desirable, to 1, extremely undesirable.
[3] Mean values in a column (vertical) with same exponent letter (a,b) did not vary significantly (P = .05).
[4] Mean values in a row (horizontal) with same exponent letter (x,y) did not vary significantly (P = .05).
[5] Level means with same underline did not vary significantly (P = .05) from each other.
[6] N.S. P≦.05.
[7] Sig. P≧.001.
[8] Sig. P≧.001.

Cooked Fresh Treated/control Frozen Fillet Quality

Sensory panels including fresh treated fillets and quick frozen fillets stored in vacuum demonstrate the effectiveness of the present invention composition treatment. Scores for the color (Table 18) and overall desirability (Table 19) of treated and control fillets did not vary significantly (P≧0.05) from each other or with respect to refrigerated storage time. Judges scored the color and juiciness of control fillets higher than treated, while treated fillet texture, flavor and overall desirability was judged superior in a non-significant manner.

The aroma of cooked frozen fillets was judged to be superior (P≧0.05) over present invention treated fillets (Table 14). No overall significant (P≧0.05) difference was observed for aroma scores with regard to time. Inspection of individual mean score ranking revealed the significant difference to be largely related to the score for the treated fillet sample at the 9 days storage time. This mean score was not only significantly (P=0.05) inferior to the control sample at 9 days but also to treated samples at 5, 7 and 12 days. This result is a clear reflection of the quality variation that exists in fillets from yellowtail rockfish.

In all of the following Tables below, as in the case of the foregoing Tables wherein the panel of judges was involved, the ranges for numerical values had a possible maximum of 9 for extremely desirable, down to a minimum of 1 for extremely undesirable. In the following Tables, the mean scores were based on a group of twenty (20) scores.

TABLE 14

Mean[1] Sensory Panel Scores[2] for the Aroma of Cooked Fresh Treated and Frozen Control Fillets.

| Examples/ Process | Mean ranking | Storage time post-process (days) | | | | |
|---|---|---|---|---|---|---|
| | | 2 | 5 | 7 | 9 | 12 |
| 53/ Treatment | Vertical[3] Horizontal[4] | 6.25$^a$ 6.25$^{x,y}$ | 6.95$^a$ 6.95$^x$ | 6.50$^a$ 6.50$^x$ | 5.60$^a$ 5.60$^y$ | 6.60$^a$ 6.60$^x$ |
| 54/ Control | Vertical Horizontal | 6.55$^a$ 6.55$^x$ | 6.65$^a$ 6.65$^x$ | 7.00$^a$ 7.00$^x$ | 6.90$^b$ 6.90$^x$ | 6.80$^a$ 6.80$^x$ |

| Factorial Analysis of Variance | | |
|---|---|---|
| F-Value | Level mean ranking[5] | |
| Treatment (A): 4.066[7] | Process | Storage |
| Storage (B): 1.184[6] | Treatment < Control | 2 > 7 > 12 > 5 > 9 |
| A × B: 1.728[6] | | |

[1] n = 20.
[2] Ranged from 9, extremely desirable, to 1, extremely undesirable.
[3] Mean values in a column (vertical) with same exponent letter ($^{a,\ b}$) did not vary significantly (P = .05).
[4] Mean values in a row (horizontal) with same exponent letter ($^{x,\ y}$) did not vary significantly (P = .05).
[5] Level means with same underline did not vary significantly (P = .05) from each other.
[6] N.S. P ≦ .05.
[7] Sig. P ≧ .05.

TABLE 15

Mean[1] Sensory Panel Scores[2] For the Color of Cooked Fresh Treated and Frozen Control Fillets.

| Examples/ Process | Mean ranking | Storage time post-process (days) | | | | |
|---|---|---|---|---|---|---|
| | | 2 | 5 | 7 | 9 | 12 |
| 55/ Treatment | Vertical Horizontal | 6.35 6.35 | 6.55 6.55 | 6.45 6.45 | 5.75 5.75 | 6.90 6.90 |
| 56/ Control | Vertical Horizontal | 6.30 6.30 | 6.25 6.25 | 6.75 6.75 | 6.45 6.45 | 6.45 6.45 |

| Factorial Analysis of Variance | | |
|---|---|---|
| F-Value | Level mean ranking[3] | |
| Treatment (A): 0.083[4] | Process | Storage |
| Storage (B): 2.165[4] | Treatment < Control | 12 > 7 > 5 > 2 > 9 |
| A × B: 2.243[4] | | |

[1] n = 20.
[2] Ranged from 9, extremely desirable, to 1, extremely undesirable.
[3] Level means with same underline did not vary significantly (P = .05) from each other.
[4] N.S. P ≦ .05.

TABLE 16

Mean[1] Sensory Panel Scores[2] For the Texture of Cooked Fresh Treated and Frozen Control Fillets.

| Examples/ Process | Mean ranking | Storage time post-process (days) | | | | |
|---|---|---|---|---|---|---|
| | | 2 | 5 | 7 | 9 | 12 |
| 57/ Treatment | Vertical Horizontal | 6.85 6.85 | 6.20 6.20 | 6.80 6.80 | 6.00 6.00 | 6.60 6.60 |
| 58/ Control | Vertical Horizontal | 6.25 6.25 | 5.90 5.90 | 6.65 6.65 | 6.40 6.40 | 6.00 6.00 |

| Factorial Analysis of Variance | | |
|---|---|---|
| F-Value | Level mean ranking[3] | |
| Treatment (A): 1.795[4] | Process | Storage |
| Storage (B): 1.692[4] | Treatment > Control | 7 > 2 > 12 > 9 > 5 |
| A × B: 0.977[4] | | |

[1] n = 20.
[2] Ranged from 9, extremely desirable, to 1, extremely undesirable.
[3] Level means with same underline did not vary significantly (P = .05) from each other.
[4] N.S. P ≦ .05.

TABLE 17

Mean[1] Sensory Panel Scores[2] For the Juiciness of Cooked Fresh Treated and Frozen Control Fillets.

| Examples/ Process | Mean ranking | Storage time post-process (days) | | | | |
|---|---|---|---|---|---|---|
| | | 2 | 5 | 7 | 9 | 12 |
| 59/ Treatment | Vertical Horizontal | 7.05 7.05 | 6.45 6.45 | 6.65 6.65 | 6.50 6.50 | 6.55 6.55 |
| 60/ Control | Vertical Horizontal | 6.40 6.40 | 6.15 6.15 | 6.65 6.65 | 6.40 6.40 | 6.60 6.60 |

| Factorial Analysis of Variance | | |
|---|---|---|
| F-Value | Level mean ranking[3] | |
| Treatment (A): 0.089[4] | Process | Storage |
| Storage (B): 1.514[4] | Treatment < Control | 2 > 7 > 9 > 5 > 12 |
| A × B: 2.101[4] | | |

[1] n = 20.
[2] Ranged from 9, extremely desirable, to 1, extremely undesirable.
[3] Level means with same underline did not vary significantly (P = .05) from each other.
[4] N.S. P ≦ .05.

TABLE 18

Mean[1] Sensory Panel Scores[2] For The Flavor of Cooked Fresh Treated and Frozen Fillets.

| Examples Process | Mean ranking | Storage time post-process (days) | | | | |
|---|---|---|---|---|---|---|
| | | 2 | 5 | 7 | 9 | 12 |
| 61/ Treatment | Vertical Horizontal | 6.70 6.70 | 6.55 6.55 | 6.05 6.05 | 5.40 5.40 | 5.65 5.65 |
| 62/ Control | Vertical Horizontal | 6.10 6.10 | 6.05 6.05 | 5.85 5.85 | 5.85 5.85 | 5.80 5.80 |

| Factorial Analysis of Variance | | |
|---|---|---|
| F-Value | Level mean ranking[3] | |
| Treatment (A): 0.383[4] | Process | Storage |
| Storage (B): 1.831[4] | Treatment > Control | 2 > 5 > 7 > 12 > 9 |
| A × B: 0.759[4] | | |

[1] n = 20.
[2] Ranged from 9, extremely desirable, to 1, extremely undesirable.
[3] Level means with same underline did not vary significantly (P = .05) from each other.
[4] N.S. P ≦ .05.

TABLE 19

Mean[1] Sensory Panel Scores[2] For the Over-all Desirability of Cooked Fresh Treated and Frozen Control Fillet.

| Example/ Process | Mean ranking | Storage time post-process (days) | | | | |
|---|---|---|---|---|---|---|
| | | 2 | 5 | 7 | 9 | 12 |
| 63/ Treatment | Vertical Horizontal | 6.75 6.75 | 6.35 6.35 | 6.35 6.35 | 5.45 5.45 | 5.75 5.75 |
| 64/ Control | Vertical Horizontal | 6.10 6.10 | 6.00 6.00 | 6.10 6.10 | 5.80 5.80 | 5.85 5.85 |

| Factorial Analysis of Variance | | |
|---|---|---|
| F-Value | Level mean ranking[3] | |
| Treatment (A): 0.557[4] | Process | Storage |
| Storage (B): 1.870[4] | Treatment > Control | 2 > 7 > 5 > 12 > 9 |

TABLE 19-continued

A × B:  0.665[4]

[1] n = 20.
[2] Ranged from 9, extremely desirable, to 1, extremely undesirable.
[3] Level means with same underline did not vary significantly (P = .05) from each other.
[4] N.S. P ≦ .05.

The foregoing Examples 1 through 64 and data illustrate that the treatment of yellowtail rockfish fillet fish product in a 13% solution (pH 6.1) of the treatment composition of the present invention set forth above at 34° F. (1.1° C.) for 60 sec. produced, among other, the following summary results:

(1) A marked extension of microbial self-life was found at 34° F. (1.1° C.); lag time to initiation of exponential growth was extended from 1.4 to 6.9 days; time to a 1×10$^6$ microbial load was extended from 6.8 to 12.4 days (shelf-life approximately doubled);

(2) A 5.3 fold reduction in the rate of drip loss was produced; and a 1.6 lg/100 lb fillet initial yield advantage plus 0.63 lb/100 lb/day during refrigerated storage was also established;

(3) An average of 342 mg $P_2O_5$/100 gm. wet wt. of fillet was added which was equivalent to 590 mg of total phosphate compounds /100 gm. This provided an average of 90 mg of potassium sorbate/100 gm wet wt., with elevated sodium levels from 35 mg to 214 mg/100 gm wet wt. and potassium levels from 398 to 427 mg/100 gm wet wt;

(4) The overall desirability over fresh fillets during a 9-day storage period improved significantly (P≧0.005) and equivalent (P≧0.05) overall desirability was provided to a quick frozen control protected in vacuum with moisture vapor-proof film over a 12 day period. It did reduce (P≧0.001) over-all appearance of raw fillets slightly, but not in an unacceptable manner; and, (5) A significantly effective, heretofore unrealized, combined yield maintenance and preservation of the product was achieved at a potentially significant savings.

Examples 65 to 128 relate to the testing of dover sole (*Microstomus pacificus*). Dover sole are found from northern Baja California to the Bering Sea at depths ranging from 600 fathoms (1100 m) to the surface. This species matures at approximately 39 cm (male) to 45 cm (female). Their usual habitat is on soft bottom and at all metamorphased stages feeding is on the bottom, concentrated on burrowing forms. Historically, the exploitation of dover sole was neglected throughout its area of distribution. The unappealing softness and sliminess of the round fish initially limited its marketing. More recently the quality of its flesh, if handled properly, and its good keeping quality in frozen storage have made it one of the more important of the small flatfishes on the Pacific Coast. The flesh of dover sole possesses a relatively high moisture content compared to other flatfish. This factor is accentuated in what is commercially referred to as "deep dover" caught in very deep depths at certain times of the year. Drip loss from fresh fillets post-process represents a major economic problem for this species. The dover sole tested, for the foregoing reasons, were significantly different from the yellowtail rockfish of Examples 1 to 64 above.

EXAMPLES 65 TO 70—Microbial Stability

Fresh fillets separated from round fish by hand filleting were obtained immediately post-process from a local commercial processor. Fillet batch sizes to meet experimental requirements were treated in the present invention composition solution (treatment) (determined pH=6.07) and in water (control) at 34° F. (1.1° C.) for 60 sec. Yield post-processing was determined after a 120 sec drain period. Frozen control samples were immediately vacuum sealed in moisture-vapor proof film and frozen at −30° F. (−34° C.) and stored at 0° F. (−17.8° C.).

Microbial stability of refrigerated fillets was determined using standard aerobic plate count procedures (growth medium composition % wt./vol.: 2.35 standard plate count agar, 0.5 tryptone, 0.5 NaCl; incubation temperature: 25° C.). Duplicate plating of 3 fillet replicates stored in individual polyethylene bags were carried out at appropriate time periods during storage at 34° F. (1.1° C.). Treatment of fillets extended the initiation of exponential growth from 2.8 for the control to 9.3 days (lag phase growth was more than tripled) (Table 20). Exponential growth for treated fillets was more rapid. If the development of 1×10$^6$ organisms/g is established as an index of maximum commercial microbial shelf-life, present inventiion treatment approximately doubled the shelf-life of fillets (from 6.6 to 12.7 days).

TABLE 20

| | Microbial Stability of Processed Dover Sole Fillets Stored Under Refrigerated Storage (34° F., 1.1° C.). | | | | | |
|---|---|---|---|---|---|---|
| Storage | Control[2] | | | Treatment[3] | | |
| time (days) | Examples[1] | Count Organisms/g | Mean | Examples[1] | Count Organisms/g | Mean |
| 0 | 65 | 2750 | 2400 | 68 | 860 | 1460 |
| | 66 | 2350 | | 69 | 1700 | |
| | 67 | 2100 | | 70 | 1820 | |
| 2 | 65 | 3600 | 2533 | 68 | 2200 | 1629 |
| | 66 | 2050 | | 69 | 1425 | |
| | 67 | 1950 | | 70 | 1255 | |
| 4 | 65 | 13,350 | 10,700 | 68 | 2000 | 1258 |
| | 66 | 10,600 | | 69 | 810 | |
| | 67 | 8,150 | | 70 | 965 | |
| 6 | 65 | 375 × 10$^3$ | 428.3 × 10$^3$ | 68 | 1545 | 1567 |
| | 66 | 570 × 10$^3$ | | 69 | 2210 | |
| | 67 | 340 × 10$^3$ | | 70 | 945 | |
| 7 | 65 | 1.855 × 10$^6$ | 3.12 × 10$^6$ | 68 | — | |
| | 66 | 4.4 × 10$^6$ | | 69 | — | |
| | 67 | — | | 70 | — | |
| 8 | 65 | 11.8 × 10$^6$ | 13.68 × 10$^6$ | 68 | 1645 | 1752 |
| | 66 | 15.85 × 10$^6$ | | 69 | 1985 | |

TABLE 20-continued

Microbial Stability of Processed Dover Sole Fillets Stored Under Refrigerated Storage (34° F., 1.1° C.).

| Storage time (days) | Control[2] Examples[1] | Count Organisms/g | Mean | Treatment[3] Examples[1] | Count Organisms/g | Mean |
|---|---|---|---|---|---|---|
| 10 | 67 | 13.4 × 10⁶ | 103.67 × 10⁶ | 70 | 1625 | 3500 |
|  | 65 | 79.0 × 10⁶ |  | 68 | 5500 |  |
|  | 66 | 117.0 × 10⁶ |  | 69 | 1500 |  |
| 12 | 67 | 115.0 × 10⁶ |  | 70 | — |  |
|  | 65 | — |  | 68 | 25.5 × 10⁶ | 2.44 × 10⁶ |
|  | 66 | — |  | 69 | 5.85 × 10⁶ |  |
| 14 | 67 | — |  | 70 | 1.44 × 10⁶ |  |
|  | 65 | — |  | 68 | 25.8 × 10⁶ | 20.42 × 10⁶ |
|  | 66 | — |  | 69 | 35.0 × 10⁶ |  |
|  | 67 | — |  | 70 | 450 × 10³ |  |

[1]Mean of duplicate.
[2]Exponential growth function (replicates for 4 through 10 days; n = 14): $y = 32.803138e^{1.551609x}$, $r = .987342$ (Sig. $P \geq .001$); computed time to initiation of exponential growth (2467 organisms/g): 2.784 days; computed time to approximately $1 \times 10^6$ organisms/g = 6.654 days.
[3]Exponential growth function (replicates for 10 through 14 days; n = 8): $y = .000028e^{1.909438x}$, $r = .829349$ (Sig. $P \geq .025$); computed time to initiation of exponential growth (1,540 organisms/g): 9.332 days; computed time to approximately $1 \times 10^6$ organisms/g = 12.723 days.

EXAMPLES 71 TO 74—Yield/Drip Loss

Drip loss during refrigerated (34° F.; 1.1° C.) storage was determined for 4 replicate units in polyethylene bags composed of 2–3 fillets each. Fillet weight after a 120 sec drain was determined at appropriate times post-processing. Drip loss was expressed as fillet yield and reported as a percent of fillet weight pre-process.

Treatment produced a 7.9 fold reduction in the rate of drip loss from fillets during refrigerated storage (Table 21). Exposure of fillets to water and treatment solution for 60 sec produced a greater uptake of the treatment solution just after the dip treatment and subsequent draining (control = 104.9 ± 0.6, treatment = 106.1 ± 1.8% of pre-process fillet wt.). Control fillets lost added water after approximately 2 days of storage, while treated fillets still retain over 103% of their pre-treatment weight after 14 days of refrigerated storage.

The linear relationship of results listed in Table 21 indicated that 100 lb of fillets exposed to water would deliver 100 lb of product after 2.7 days of refrigerated storage. Conversely, only 95.3 lb of fillets would be required to deliver 100 lb after 2.7 days of storage after treatment. The computed total yield advantage of fillets exposed to the treatment over those exposed to water equaled 1.016 lb/100 lb/day of storage +1.1 lb/00 lb (Table 22). Under commercial practice fish are delivered to retail markets at approximately 3 days post-catch and are marketed up to 10 days post-catch depending upon initial fillet quality. The net gain for the treatment in this market system would range from 5.06 (3 days) to 11.15 lb (9 days)/100 lb of fillets. The would yield a savings of 8.349 to $18.397/100 lb of fillets at the February, 1982, wholesale value for this species ($1.65/lb in large lots).

Based upon only yield and drip loss, the economic advantage of the treatment can be expressed as a value of the dry chemical treatment mixture to the processor. Neglecting treatment solution start-up volumes, 5.8 lb of solution was required to yield 100 lb of treated fillets. At a 13% concentration, 100 lb of fillets required 0.754 lb of present invention dry chemical mixture. The present invention dry chemical mixture would be worth from $11.073 to $24.797/lb to the processor.

TABLE 21

Dover Sole Fillet Yield Through Treatment and Drip Loss During Refrigerated Storage (34° F., 1.1° C.).

| Storage Time (days) | Percent of pre-process weight[1] | | | |
|---|---|---|---|---|
|  | Example 71-Control | | Example 72-Treatment | |
|  | Mean[2] | S.D. | Mean[2] | S.D. |
| 0 | 104.9 | 0.6 | 106.1 | 1.8 |
| 2 | 100.1 | 1.0 | 104.5 | 2.1 |
| 4 | 96.8 | 2.0 | 104.4 | 2.3 |
| 7 | 95.2 | 1.3 | 104.3 | 2.5 |
| 9 | 93.8 | 1.7 | 104.1 | 2.7 |
| 11 | [3] |  | 103.2 | 4.3 |
| 14 | [3] |  | 103.8 | 3.2 |

[1]Weight of fillet after 60 sec treatment at 34° F. (1.1° C.) and subsequent 120 sec drain/weight of fillet pre-process × 100.
[2]Four × 2–3 fillet units.
[3]Spoiled.

TABLE 22

Computed[1] Quantity of Dover Sole Fillets Prior to Pre-process Required to Meet a Delivered Unit Weight at Various Time Periods Under Refrigeration Post-process.

| Storage Time (day) | Pounds/100 lb delivered | | Net gain (lb/100 lb) |
|---|---|---|---|
|  | Example 73-Control | Example 74-Treatment |  |
| 0 | 95.3 | 94.2 | 1.1 |
| 2 | 99.9 | 95.7 | 4.2 |
| 4 | 103.3 | 95.8 | 7.5 |
| 7 | 105.0 | 95.9 | 9.1 |
| 9 | 106.6 | 96.1 | 10.5 |
| 11 | — | 96.9 | — |
| 14 | — | 96.3 | — |

[1]Based upon the mean four replicate samples.

EXAMPLES 75 TO 80—Fillet Composition

Alterations of fillet chemical characteristics by the present invention treatment was assessed by analysis of 3 fillet replicates. Potassium sorbate and total phosphorus content was determined using spectrophotometric procedures. Moisture was reported as weight loss after 12–16 hrs of oven drying at 100° C. Total ash was expressed as the weight remaining after 12 hrs of heating at 650° C. Sodium and potassium were determined from a wet ash of the fillet utilizing atomic absorption procedures.

Treatment for 60 sec yielded fillets with reduced moisture contents and elevated ash contents (Table 23). The initial average moisture content of fillets exposed to water was 100.6% of treated fillets; average fillet ash content was 220.4% wet weight and 212.4% dry weight.

Fillet phosphorus as $P_2O_5$ content was increased from an average of 659 to 1901 mg/100 g wet weight by the treatment (Table 23). This was equivalent to an average addition of 271 mg phosphorus/100 g wet weight yielding a total average phosphorus content of 415 mg/100 g wet weight. This added phosphorus would be equivalent to 720 mg of phosphorus-containing compounds /100 g (0.72% wet wet.). Treated fillet phosphorus level was significantly higher than that reported for raw muscle from chicken (203 mg P/100 g), beef (188 mg P/100 g) and pork muscle (152 mg P/100 g).

The average sodium and potassium content of fillets was increased by the treatment by 346 and 14 mg/100 g wet weight, respectively (Table 23). Average sodium content was increased from 69 to 415 mg/100 g. Treated fillet sodium content far exceeded that reported for muscle from chicken (58 mg/100 g), pork (47 mg/100 g), and beef (65 mg/100 g). Addition of 346 mg of sodium/100 g derived from condensed phosphate would be equivalent to a fillet salt (NaCl) content of 879 mg/100 g (0.879% wet wt.). Alteration of fillet potassium content by absorbed potassium sorbate (14 mg/100 g) did not constitute a significant nutritional factor. The potassium content of both control (303 mg/100 g) and treated (317 mg/100 g) compared favorably to muscle from chicken (285 mg/100 g), pork (216 mg/100 g) and beef (299 mg/100 g).

As mentioned, although nutritionists disagree as to which is most important, sodium content or the ratio of dietary sodium/potassium, fillet treatment markedly altered this ratio in fish fillets. The average sodium/potassium ratio for fillets was altered from 0.23 to 1.31 by treatment and varied considerably from that of muscle from chicken (0.20), pork (0.22) and beef (0.22).

Treatment of fillets yielded an average of 133.6 mg potassium sorbate/100 g of fillet under the solution time and temperature conditions used (131 mg/100 g if background reflected in control samples was deducted) (Table 23). Potassium sorbate levels appeared to vary in a direct linear relationship to fillet weight; small fillets with a greater surface area/unit weight contained a higher total concentration.

EXAMPLE 81 TO 104—Fillet Appearance

The quality characteristics of fillets was evaluated utilizing the panel of judges (20) who normally judge a wide variety of food products. Again, quality factors were judged on a 9 point desirability sale, ranging from 9, extremely desirable, to 1, extremely undesirable.

Judges evaluated raw fillets for appearance in fiber board trays with a Saran overwrap. Four replicate samples for each treatment were judged for color, freshness and over-all desirability under fluorescent light. Raw fillets were judged at appropriate time periods commensurate with the projected microbial stability of control samples.

Overall, the appearance of treated fillets were judged to be slightly superior to control (Tables 24 to 26). This superiority was significant with regard to freshness, but judgement scores for color and overall desirability were not significantly ($P \leq 0.05$) higher. Inspection of individual treatment mean scores for all three judgement factors revealed scores for treatment fillets to be higher or nearly equal at 2, 4 and 7 days, but at 9 and 11 days control and treatment fillets were nearly equal. All differences were not large and were complicated by the variability of individual fillets within each treatment. Even the overall significant ($P \geq 0.025$) superiority of freshness scores (Table 25) for treated fillets could not be detected by L.S.D. ranking at $P = 0.05$.

The appearance of both control and treated fillets degraded with respect to storage time (Tables 24 to 26). Treatment fillets possessed higher initial scores, but degraded at a more rapid rate of yield nearly equal scores after 9 and 11 days of storage. Regression of mean replicate scores (n=20) on storage time ($P \geq 0.025 - P \geq 0.001$) yielded rates of score reduction for treated 1.19-1.29 times more rapid than control fillets.

Judges did not reflect apparent microbial spoilage in scores for appearance. Control samples at 7, 9 and 11 days post-process were clearly microbiologically unacceptable. At 11 days post-catch, odor was quite noticeable, but unfortunately samples were situated in a proximity to treated fillets which did not allow judges to determine from which sample the odor was derived.

TABLE 24

Mean Appearance Panel Scores[1] for the Color of Raw Dover

TABLE 23
Composition of Processed Dover Sole Fillets.

| Example | Rep./Fillet wt. (g) | Percent | | Mg/100 g | | | |
|---|---|---|---|---|---|---|---|
| | | Moisture | Ash | K—sorbate | P(as $P_2O_5$) | Na | K |
| 75/ | 1 | 84.84 | 0.88 | 2.01 | 631 | 82.1 | 286.8 |
| Control | 80.0 | ±.39 | ±.00 | ±.68 | ±.3 | ±5.9 | ±4.3 |
| 76/ | 2 | 84.96 | 0.97 | 2.07 | 677 | 64.0 | 309.8 |
| Control | 187.9 | ±.22 | ±.03 | ±.01 | ±11.8 | ±1.1 | ±16.9 |
| 77/ | 3 | 85.59 | 0.94 | 2.68 | 671 | 60.9 | 311.9 |
| Control | 105.6 | ±.00 | ±.00 | ±.00 | ±3.0 | ±5.0 | ±18.2 |
| | Mean[1] | 85.13 | 0.93 | 2.25 | 659 | 69.0 | 303.0 |
| | S.D. | .41 | .03 | .45 | 23.1 | 10.7 | 17.4 |
| 78/ | 1 | 84.64 | 2.54 | 184.00 | 2406 | 591.5 | 309.3 |
| Treated | 65.7 | ±.03 | ±.01 | ±.96 | ±101.1 | ±9.5 | ±7.4 |
| 79/ | 2 | 85.17 | 1.68 | 98.45 | 1539 | 316.1 | 321.2 |
| Treated | 252.0 | ±.02 | ±.02 | ±.22 | ±32.8 | ±12.1 | ±7.9 |
| 80/ | 3 | 83.92 | 1.92 | 118.25 | 1757 | 338.5 | 319.9 |
| Treated | 154.1 | ±.04 | ±.00 | ±2.62 | ±16.6 | ±23.5 | ±29.1 |
| | Mean[1] | 84.57 | 2.05 | 133.58 | 1901 | 415.4 | 316.8 |
| | S.D. | ±.56 | ±.39 | 40.08 | ±406.1 | ±133.1 | 16.5 |

[1]Mean for all replications.

TABLE 24-continued

Sole Fillets.

| Process | Mean ranking | Example Rep.[2] | Storage time post-process (days) | | | | |
|---|---|---|---|---|---|---|---|
| | | | 2 | 4 | 7 | 9 | 11 |
| Control | | 81 | 7.40 | 6.65 | 5.95 | 6.05 | 6.10 |
| | | 82 | 7.25 | 6.30 | 6.40 | 5.85 | 5.45 |
| | | 83 | 4.90 | 5.50 | 5.55 | 5.30 | 4.95 |
| | | 84 | 6.85 | 6.60 | 6.30 | 5.95 | 5.85 |
| | Vertical[4] | Mean[3] | $6.60^a$ | $5.81^a$ | $6.05^a$ | $5.79^a$ | $5.59^a$ |
| | Horizontal[5] | | $6.60^x$ | $5.81^y$ | $6.06^{x,y}$ | $5.79^y$ | $5.59^y$ |
| Treated | | 85 | 6.15 | 5.70 | 5.85 | 5.65 | 4.60 |
| | | 86 | 6.20 | 5.95 | 5.95 | 5.95 | 4.95 |
| | | 87 | 6.95 | 6.80 | 5.70 | 5.85 | 5.15 |
| | | 88 | 7.25 | 6.75 | 6.50 | 6.15 | 6.15 |
| | Vertical | Mean | $6.64^a$ | $6.30^a$ | $6.00^a$ | $5.90^a$ | $5.21^a$ |
| | Horizontal | | $6.64^x$ | $6.30^{x,y}$ | $6.00^y$ | $5.90^y$ | $5.21^z$ |

Factorial Analysis of Variance

| F-Value | | Level mean ranking[6] | |
|---|---|---|---|
| Treatment (T): | $0.105^7$ | Process | Storage |
| Storage (S): | $8.997^8$ | Control < Treatment | 2 > 4 > 7 > 9 > 11 |
| T × S: | $1.126^7$ | | |

[1]Range from 9, extremely desirable, to 1, extremely undesirable.
[2]n = 20.
[3]n = 80.
[4]Mean values in a column (vertical) with same exponent letter (a,b) did not vary significantly (P = .05).
[5]Mean values in a row (horizontal) with same exponent letter (x, y, z) did not vary significantly (P = .05).
[6]Level means with same underline did not vary significantly (P = .05) from each other.
[7]N.S. P ≤ .05.
[8]Sig. P ≥ .001.

TABLE 25

Mean Appearance Panel Scores[1] for the Freshness of Raw Dover Sole Fillets.

| Process | Mean ranking | Example Rep.[2] | Storage time post-process (days) | | | | |
|---|---|---|---|---|---|---|---|
| | | | 2 | 4 | 7 | 9 | 11 |
| Control | | 89 | 6.90 | 6.20 | 6.00 | 6.00 | 5.40 |
| | | 90 | 6.60 | 6.30 | 5.95 | 5.60 | 5.00 |
| | | 91 | 5.00 | 5.55 | 5.05 | 5.60 | 4.20 |
| | | 92 | 6.70 | 6.65 | 5.80 | 6.00 | 5.25 |
| | Vertical[4] | Mean[3] | $6.30^a$ | $6.17^a$ | $5.70^a$ | $5.80^a$ | $4.96^a$ |
| | Horizontal[5] | | $6.30^x$ | $6.17^{x,y}$ | $5.70^y$ | $5.80^{x,y}$ | $4.96^z$ |
| Treated | | 93 | 6.30 | 5.70 | 5.45 | 5.45 | 4.85 |
| | | 94 | 6.70 | 6.10 | 6.25 | 5.75 | 4.80 |
| | | 95 | 7.10 | 7.05 | 6.15 | 5.60 | 5.75 |
| | | 96 | 7.20 | 6.55 | 5.95 | 6.00 | 5.55 |
| | Vertical | Mean | $6.82^a$ | $6.35^a$ | $5.91^a$ | $5.70^a$ | $5.24^a$ |
| | Horizontal | | $6.82^w$ | $6.35^{w,x}$ | $5.91^{x,y}$ | $5.70^y$ | $5.24^z$ |

Factorial Analysis of Variance

| F-Value | | Level mean ranking[6] | |
|---|---|---|---|
| Treatment (T): | $2.957^8$ | Process | Storage |
| Storage (S): | $15.523^9$ | Control < Treatment | 2 ≥ 4 ≥ 7 ≥ 9 ≥ 11 |
| T × S: | $0.627^7$ | | |

[1]Range from 9, extremely desirable, to 1, extremely undesirable.
[2]n = 20.
[3]n = 80.
[4]Mean values in a column (vertical) with same exponent letter (a, b) did not vary significantly (P = .05).
[5]Mean values in a row (horizontal) with same exponent letter (w, x, y, z) did not vary significantly (P = .05).
[6]Level means with same underline did not vary significantly (P = .05) from each other.
[7]N.S. P ≤ .05.
[8]Sig. P ≥ .025.
[9]Sig. P ≥ .001.

TABLE 26

Mean Appearance Panel Scores[1] for the Overall Desirability of Raw Dover Sole Fillets.

| Process | Mean ranking | Example Rep.[2] | Storage time post-process (days) | | | | |
|---|---|---|---|---|---|---|---|
| | | | 2 | 4 | 7 | 9 | 11 |
| Control | | 97 | 7.20 | 6.20 | 5.85 | 5.95 | 5.60 |
| | | 98 | 6.75 | 6.15 | 6.05 | 5.70 | 4.90 |
| | | 99 | 4.85 | 5.65 | 5.30 | 5.55 | 4.55 |
| | | 100 | 6.65 | 6.70 | 5.95 | 5.95 | 5.45 |
| | Vertical[4] | Mean[3] | $6.36^a$ | $6.17^a$ | $5.79^a$ | $5.79^a$ | $5.12^a$ |
| | Horizontal[5] | | $6.36^x$ | $6.17^{x,y}$ | $5.79^y$ | $5.79^y$ | $5.12^z$ |
| Treated | | 101 | 6.00 | 5.75 | 5.60 | 5.35 | 4.85 |
| | | 102 | 6.40 | 5.95 | 6.25 | 5.75 | 4.75 |
| | | 103 | 6.85 | 6.90 | 6.05 | 5.65 | 5.45 |
| | | 104 | 7.15 | 6.55 | 6.25 | 5.95 | 5.70 |
| | Vertical | Mean | $6.60^a$ | $6.29^a$ | $6.04^a$ | $5.67^a$ | $5.19^a$ |
| | Horizontal | | $6.60^w$ | $6.29^{w,x}$ | $6.04^{x,y}$ | $6.67^{y,z}$ | $5.19^z$ |

Factorial Analysis of Variance

| F-Value | | Level mean ranking[6] | |
|---|---|---|---|
| Treatment (T): | $0.829^7$ | Process | Storage |
| Storage (S): | $14.107^8$ | Control < Treatment | 2 ≥ 4 > 7 ≥ 9 > 11 |
| T × S: | $0.300^7$ | | |

[1]Range from 9, extremely desirable, to 1, extremely undesirable.
[2]n = 20.
[3]n = 80.
[4]Mean values in a column (vertical) with same exponent letter (a, b) did not vary significantly (P = .05).
[5]Mean values in a row (horizontal) with same exponent letter (w, x, y, z) did not vary significantly (P = .05).
[6]Level means with same underline did not vary significantly (P = .05) from each other.
[7]N.S. P ≤ .05.
[8]Sig. P ≥ .001.

EXAMPLES 105 TO 128—Cooked Fillet Quality

The eating quality of cooked (baked to flaking in aluminum foil without salt) flesh was judged for aroma, color, texture, juiciness, flavor and overall desirability. Hot samples were served in coded cups to judges in individual booths under white light. The quality of the present invention treatment was evaluated with both a fresh control and a frozen control. A frozen control evaluation was carried out to estimate the quality of treated fillets during their extended refrigerated shelf-life.

Fresh control samples were judged unfit for human consumption after 7 days storage; evaluations were only carried out at 2 and 4 days post-process. Factorial analysis of the variance of scores for the aroma, color, texture, juiciness, flavor and over-all desirability of cooked meat revealed no overall significant (P≤0.05) difference in the desirability and refrigerated shelf-life of control and treated samples (Table 27). A significant (P≧0.05) interaction affect between treatment and storage for overall desirability scores was observed. This result reflected a larger reduction in scores for the control over those for the treatment with respect to storage time. However, these changes could not be detected by ranking at the P=0.05 level.

Treatment markedly improved scores for texture, juiciness, flavor and overall desirability after 4 days of refrigerated storage. The lack of statistical significance between scores was directly related to the wide variation in judgement scores by panelists. Generally, individuals liked sole or they rather disliked its flavor and textural characteristics regardless of its quality characteristics.

TABLE 27

Mean[1] Sensory Panel Scores[2] for Cooked Fresh Dover Sole Fillets.

| Factor | Example | Storage Time Post-process (days) 2 | 4 | Factorial Analysis of Variance: F-Values Treatment (T) | Storage (S) | T × S |
|---|---|---|---|---|---|---|
| Aroma | 105/Control | 6.35 | 5.85 | 0.351[3] | 2.656[3] | 0.022[3] |
|  | 106/Treated | 6.20 | 5.60 |  |  |  |
| Color | 107/Control | 6.50 | 5.75 | 0.840[3] | 2.630[3] | 0.244[3] |
|  | 108/Treated | 6.65 | 6.25 |  |  |  |
| Texture | 109/Control | 4.90 | 4.20 | 1.635[3] | 0.235[3] | 0.562[3] |
|  | 110/Treated | 5.20 | 5.35 |  |  |  |
| Juiciness | 111/Control | 6.05 | 5.10 | 1.790[3] | 0.947[3] | 1.789[3] |
|  | 112/Treated | 6.05 | 6.20 |  |  |  |
| Flavor | 113/Control | 5.55 | 4.20 | 0.662[3] | 2.649[3] | 2.284[3] |
|  | 114/Treated | 5.25 | 5.20 |  |  |  |
| Overall Desirability | 115/Control | 5.10$^{ax}$ | 4.20$^{ax}$ | 0.289[3] | 0.803[3] | 4.030[4] |
|  | 116/Treated | 4.80$^{ax}$ | 4.95$^{ax}$ |  |  |  |

[1] n = 20.
[2] Range from 9, extremely desirable, to 1, extremely undesirable.
[3] N.S. P ≦ .05.
[4] Sig. P ≧ .05.
Mean values for each factor in a column (process) (a & b) or in a row storage (x & y) with same exponent letter did not vary significantly (P = .05).

Cooked Fresh Treated/Control Frozen Fillet Quality

Unlike fresh control samples, treated fillets were still acceptable after 11 days refrigerated storage (Table 28). Factorial analysis showed that fresh treated samples did not vary significantly (P≦0.05) overall from frozen control samples with regard to all sensory factors. Treatment and storage time interacted to significantly affect the relationship of scores for color, flavor and overall desirability. Inspection of individual treatment means revealed this result to be a direct result of a significant (P=0.05) reduction or variability in scores for treatment samples after 9 and 11 days of storage while scores for the frozen control did not exhibit a significant (P=0.05) reduction with respect to time.

Scores for the color of frozen controls were shown to be superior (P=0.05) at 11 days as were flavor scores at 9 and 11 days. The interaction effect in overall desirability scores was more related to variability in scores which was not entirely storage time dependent and was not accompanied by a significant (P=0.05) superiority of control scores.

The results observed in this comparison of treated fillets with a frozen control demonstrated the effectiveness of the chemical treatment system. Although scores for the color and flavor of fillets was significantly reduced from frozen control samples after 9 and 11 days of storage, fillets were still edible. In comparison to the fresh control sample which became inedible between 4 and 7 days post-process, a remarkable extension of shelf-life was achieved.

TABLE 28

Mean[1] Sensory Panel Scores[2] for Cooked Fresh and Treated and Frozen Control Dover Sole Fillets.

| Factor | Example | Storage time post-process (days) 2 | 4 | 7 | 9 | 11 |
|---|---|---|---|---|---|---|
| Aroma | 117/Control | 6.25 | 6.05 | 6.35 | 6.45 | 6.05 |
|  | 118/Treated | 5.80 | 6.40 | 6.00 | 5.75 | 5.65 |
| Color | 119/Control | 6.65$^{ax}$ | 6.00$^{ax}$ | 6.10$^{ax}$ | 6.40$^{ax}$ | 6.50$^{ax}$ |
|  | 120/Treated | 6.75$^{ax}$ | 6.75$^{ax}$ | 5.65$^{ay}$ | 6.10$^{axy}$ | 5.20$^{by}$ |
| Texture | 121/Control | 5.65 | 4.30 | 5.70 | 5.40 | 5.90 |
|  | 122/Treated | 5.15 | 5.30 | 4.90 | 5.20 | 5.65 |
| Juiciness | 123/Control | 6.15 | 5.80 | 6.00 | 5.80 | 6.50 |
|  | 124/Treated | 6.65 | 6.75 | 5.70 | 5.40 | 6.45 |
| Flavor | 125/Control | 5.65$^{ax}$ | 5.35$^{ax}$ | 5.50$^{ax}$ | 5.80$^{ax}$ | 6.20$^{ax}$ |
|  | 126/Treated | 5.65$^{ax}$ | 6.30$^{ax}$ | 5.60$^{axy}$ | 4.50$^{ay}$ | 4.20$^{ax}$ |
| Overall Desirability | 127/Control | 5.40$^{ax}$ | 4.80$^{ax}$ | 5.65$^{ax}$ | 5.75$^{ax}$ | 5.85$^{ax}$ |
|  | 128/Treated | 5.00$^{axy}$ | 6.10$^{bx}$ | 5.15$^{axy}$ | 4.65$^{ay}$ | 5.00$^{ax}$ |

| Factor | Factorial Analysis of Variance: F-Value Treatment (T) | Storage (S) | T × S |
|---|---|---|---|
| Aroma | 2.031[3] | 0.365[3] | 0.652[3] |
| Color | 1.299[3] | 2.304[3] | 2.556[4] |
| Texture | 0.285[3] | 1.227[3] | 1.191[3] |
| Juiciness | 0.114[3] | 1.523[3] | 0.966[3] |
| Flavor | 1.891[3] | 0.780[3] | 3.273[5] |
| Overall Desirability | 1.468[3] | 0.189[3] | 2.714[3] |

[1] n = 20.
[2] Range from 9, extremely desirable, to 1, extremely undesirable.
[3] N.S. P ≧ .05.
[4] Sig. P ≧ .05.
[5] Sig. P ≧ .025.
Mean values for each factor in a column (process) (a & b) or in a row (storage) (x & y) with same exponent letter did not vary significantly (P = .05).

Treatment of dover sole (*Microstomus pacificus*) fillets in a 13% solution (determined pH 6.07) of the combined chemical mixture at 34° F. (1.1° C.) for 60 sec based on Examples 75 to 128 above, produced the following summary results:

(1) Microbial growth at 34° F. (1.1° C.) was remarkably retarded: lag time to initiation of exponential growth extended from 2.8 to 9.3 days; and the time to a $1 \times 10^6$ microbial load was extended from 6.6 to 12.7 days (shelf-life was approximately doubled with fillets possessing a markedly reduced microbial load during commercial shelf-life);

(2) A 7.9 fold reduction in the rate of drip loss was achieved and a 1.1 lb/100 lb fillet initial yield advantage, plus 1.016 lb/100 lb/day during refrigerated storage advantage were established;

(3) An average of 1242 mg $P_2O_5$/100 g wet wt. of fillet which was equivalent to 720 mg of total phosphate compounds /100 g. was added, with an average of 131 mg potassium sorbate/100 g wet wt. Average sodium levels were only elevated from 69.0 to 415.4 m/100 g wet wt and average potassium levels from 303 to 317 mg/100 gm. wet wt.; and, (4) Treatment did not significantly alter the desirability of cooked fish over an 11 day storage period when compared to fresh and frozen control fillets. Raw appearance of fillets was slightly improved over control fillets, particularly between 0 and 7 days post-process.

What is claimed is:

1. A fish treatment composition which comprises:
  (a) a phosphate mixture containing at least two of the following groups:
    (i) about 0% to about 95% of sodium pyrophosphate (-diphosphate), potassium pyrophosphate (-diphosphate), or a mixture thereof;
    (ii) about 14% to about 90% of sodium tripolyphosphate, potassium tripolyphosphate, or a mixture thereof;
    (iii) about 5% to about 50% of sodium hexametaphosphate, potassium hexametaphosphate or a mixture thereof,
  wherein said percentages are by weight based on the weight of the phosphate mixture, and said phosphate mixture has a statistical average content by weight of $P_2O_5$ of about 47% to about 68%; and
  (b) a preservative consisting of potassium sorbate, sorbic acid or a mixture thereof, in an amount by weight of about 0.1 to about 0.2 parts per part of said phosphate mixture; and,
  (c) sufficient citric acid such that when said composition is present in a suitable liquid vehicle, a pH in the range of about 5.6 to about 6.5 is attained.

2. The fish treatment composition of claim 1 wherein said phosphate mixture consists of the sodium compounds.

3. The composition of claim 2 wherein said phosphate mixture contains at least two of the following:
  (i) about 0% to about 80% of sodium pyrophosphate (-diphosphate), potassium pyrophosphate (-diphosphate), or a mixture thereof;
  (ii) about 60% to about 90% of sodium tripolyphosphate, potassium tripolyphosphate, or a mixture thereof;
  (iii) about 10% to about 40% of sodium hexametaphosphate, potassium hexametaphosphate or a mixture thereof.

4. The composition of claim 2 wherein said preservative is present in an amount of from about 0.13 to about 0.16 parts per part of said phosphate mixture.

5. The composition of claim 2 wherein the citric acid is present in an amount sufficient to adjust the pH into a range of about 5.8 to about 6.3.

6. A product which comprises the composition of claim 1 and a compatible liquid vehicle, said vehicle being present in an amount of at least 80% by weight of the product.

7. The product of claim 6 wherein said phosphate mixture consists of the sodium compounds.

8. The product of claim 7 wherein said phosphate mixture contains at least two of the following:
  (i) about 0% to about 80% of sodium pyrophosphate (-diphosphate), potassium pyrophosphate (-diphosphate), or a mixture thereof;
  (ii) about 60% to about 90% of sodium tripolyphosphate, potassium tripolyphosphate, or a mixture thereof;
  (iii) about 10% to about 40% of sodium hexametaphosphate, potassium hexametaphosphate or a mixture thereof.

9. The product of claim 7 wherein said preservative is present in an amount of about 0.13 to about 0.16 parts per part of said phosphate mixture.

10. The product of claim 7 wherein the citric acid is present in an amount sufficient to adjust the pH of said product into a range of about 5.8 to about 6.3.

11. The product of claim 6 wherein said liquid vehicle comprises water.

12. A method of treating fish comprising applying to the surface of said fish an effective amount of the product of claim 6.

13. A method of treating fish fillet comprising applying the product of claim 6 to a fish fillet.

14. The method of claim 12 wherein said vehicle comprises water.

15. The method of claim 13 wherein said vehicle comprises water.

16. The composition of claim 1 wherein said phosphate mixture comprises sodium tripolyphosphate and sodium hexametaphosphate; and said preservative comprises potassium sorbate.

17. A method of treating fish comprising applying to the surface of said fish an effective amount of the composition of claim 1, 2, 3, 4, 5, 7, 8, 9, 10 or 11.

18. The product of claim 6 wherein said liquid vehicle is present in an amount of at least 85%.

* * * * *